(12) United States Patent
Chih

(10) Patent No.: US 9,877,574 B1
(45) Date of Patent: Jan. 30, 2018

(54) ADJUSTABLE HOLDER

(71) Applicant: Lu Ying Chih, Guangzhou (TW)

(72) Inventor: Lu Ying Chih, Guangzhou (TW)

( * ) Notice: Subject to any disclaimer, the term of this patent is extended or adjusted under 35 U.S.C. 154(b) by 0 days.

(21) Appl. No.: 15/202,321

(22) Filed: Jul. 5, 2016

(51) Int. Cl.
| | | |
|---|---|---|
| *A47B 81/02* | (2006.01) | |
| *A47B 43/00* | (2006.01) | |
| *A47B 47/00* | (2006.01) | |
| *A47B 57/00* | (2006.01) | |
| *A46B 17/00* | (2006.01) | |
| *F16B 47/00* | (2006.01) | |
| *F16M 11/10* | (2006.01) | |
| *F16M 13/02* | (2006.01) | |
| *F16B 2/22* | (2006.01) | |
| *A46B 9/04* | (2006.01) | |
| *A46B 9/02* | (2006.01) | |
| *A47F 5/05* | (2006.01) | |
| *A47F 5/04* | (2006.01) | |
| *A47B 17/02* | (2006.01) | |
| *A47F 5/00* | (2006.01) | |
| *A47B 57/04* | (2006.01) | |

(52) U.S. Cl.
CPC .............. *A46B 17/00* (2013.01); *A46B 9/021* (2013.01); *A46B 9/04* (2013.01); *A47B 17/02* (2013.01); *A47B 57/04* (2013.01); *A47F 5/0037* (2013.01); *A47F 5/04* (2013.01); *A47F 5/05* (2013.01); *F16B 2/22* (2013.01); *F16B 47/00* (2013.01); *F16M 11/10* (2013.01); *F16M 13/022* (2013.01); *A46B 2200/1046* (2013.01); *A46B 2200/1066* (2013.01)

(58) Field of Classification Search
CPC ........... A46B 17/00; A46B 9/021; A46B 9/04; A46B 2200/1046; A46B 2200/1066; A46B 17/02; F16B 2/22; F16B 47/00; F16M 11/10; F16M 13/022; A47B 87/005; A47B 81/02; A47B 57/04; A47F 7/0021; A47F 7/0028; A47F 5/04; A47F 5/05; A47F 5/0037; A47F 2005/165; A47F 5/12; A47F 5/16; A47G 29/08; A47K 5/18; A47K 1/09; B44D 3/003
USPC ..... 211/65, 196, 205, 163, 70, 78, 165, 150, 211/197; 108/6, 8, 9, 62, 94; 248/415, 248/371, 372.1, 393, 395, 397
See application file for complete search history.

(56) References Cited

U.S. PATENT DOCUMENTS

| | | | | |
|---|---|---|---|---|
| 258,558 | A * | 5/1882 | Cook | H01L 21/6838 108/8 |
| 538,534 | A * | 4/1895 | ONeill | A47B 23/046 108/8 |
| 872,771 | A * | 12/1907 | St. Clair | A47F 5/02 211/165 |
| 906,963 | A * | 12/1908 | Thompson | D06F 57/04 211/165 |
| 1,045,583 | A * | 11/1912 | Mills | G10G 5/00 211/165 |

(Continued)

*Primary Examiner* — Jennifer E. Novosad
(74) *Attorney, Agent, or Firm* — Michael J. Foycik, Jr.

(57) ABSTRACT

A holder for utensils is manually adjustable, and capable of supporting a plurality of utensils in a range of positions from an upright position through an inverted position. The adjustments are incremental. The holder can be attached or mounted to a surface using a suction cup or through use of adhesive or other types of attachment methods. The utensils can be make up make up brushes, toothbrushes or paintbrushes, or other implements.

11 Claims, 13 Drawing Sheets

(56) References Cited

U.S. PATENT DOCUMENTS

| | | | | |
|---|---|---|---|---|
| 1,807,990 | A * | 6/1931 | Landers | A47F 5/04 211/166 |
| 2,139,649 | A * | 12/1938 | Aanerud | A47F 5/04 248/121 |
| 2,193,647 | A * | 3/1940 | Rush | A47B 23/02 108/129 |
| 2,197,359 | A * | 4/1940 | Cook | A47B 41/04 108/107 |
| 2,609,035 | A * | 9/1952 | Jones | A47C 16/025 108/8 |
| 3,095,000 | A * | 6/1963 | Hirst | B44D 3/24 134/164 |
| 3,532,222 | A * | 10/1970 | Madden | B44D 3/04 211/65 |
| 3,924,749 | A * | 12/1975 | Weston | A47F 5/04 211/169 |
| 4,620,652 | A * | 11/1986 | Hanlon | D05B 91/14 206/394 |
| 4,781,355 | A * | 11/1988 | Jeantin | A47B 19/06 248/174 |
| 5,072,904 | A * | 12/1991 | Taylor | A46B 17/00 211/65 |
| 5,690,310 | A * | 11/1997 | Brown | A47B 23/043 248/444.1 |
| 5,749,480 | A * | 5/1998 | Wood | A47B 57/04 211/150 |
| 6,241,105 | B1 * | 6/2001 | Pomper | A47F 5/04 206/6.1 |
| 6,662,734 | B2 * | 12/2003 | Chang | A47B 17/065 108/103 |
| 7,077,276 | B1 * | 7/2006 | Romano | D06F 57/04 211/118 |
| 7,690,605 | B2 * | 4/2010 | Lee | F16M 11/10 248/133 |
| 7,731,135 | B2 * | 6/2010 | Richter | B60R 11/0235 248/125.1 |
| 8,720,703 | B1 * | 5/2014 | Pressler | A46B 17/02 211/1.3 |
| 2006/0180559 | A1 * | 8/2006 | Roberti | B44D 3/12 211/65 |
| 2007/0163973 | A1 * | 7/2007 | Smokowicz | A01G 5/04 211/70 |
| 2009/0065373 | A1 * | 3/2009 | Kornowski | A45C 11/16 206/6.1 |
| 2011/0147324 | A1 * | 6/2011 | Sankey | A47F 5/02 211/59.2 |
| 2015/0060373 | A1 * | 3/2015 | Byeon | A46B 17/02 211/1.3 |

* cited by examiner

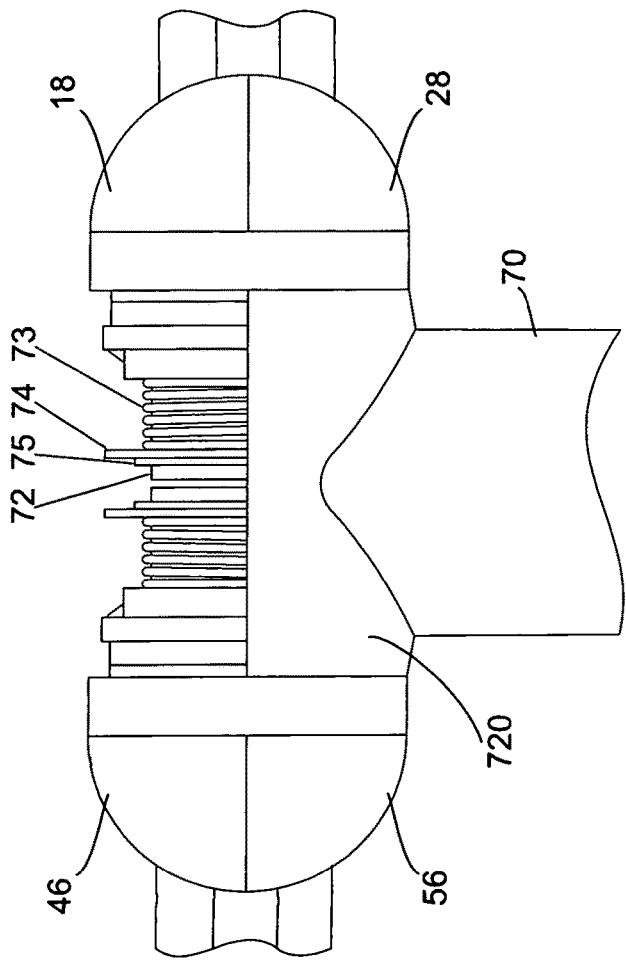
FIG.5
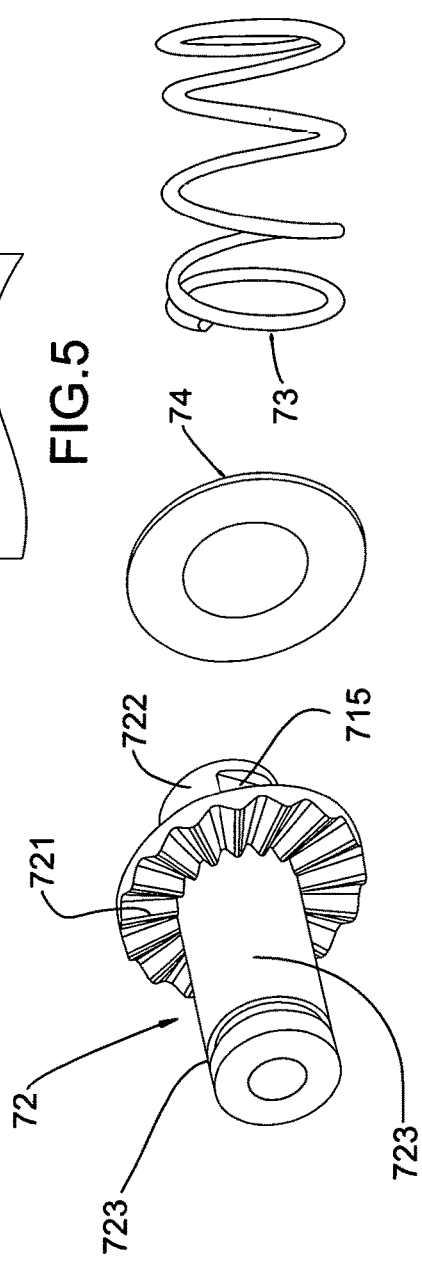
FIG.9
FIG.8
FIG.7
FIG.6

ADJUSTABLE HOLDER

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to adjustable holders, and specifically to the field of holders for utensils.

BACKGROUND OF THE INVENTION

It is a problem in the art to support utensils such as make up brushes, toothbrushes, pens, paintbrushes, and the like. It is a further problem in the art to provide a convenient manually adjustable holder capable of supporting utensils in more than one position.

In the case of make up brushes, paintbrushes and toothbrushes, it is desirable to orient the brushes in one direction for drying purposes and in another position for convenience of use. For example, in the case of make up brushes or toothbrushes, an ideal drying position is one wherein the bristles are disposed at a lower position than the handle to avoid runoff from the bristles onto the handle after use. The same approach is applicable to paintbrushes.

Ordinary make up brush holders, paintbrush holders and toothbrush holders are simple and hold the brush in a single position, either with the bristles up or the bristles down.

Accordingly, there is a need for a utensil holder that is convenient and that allows utensils to be placed in different manually adjustable positions.

There is a further need for a utensil holder that is also capable of holding modern electronic devices such as cell phones and tablet computers at varying angles. This would be especially useful in areas where water may be present on surfaces, such as in kitchens and bathrooms.

Ordinary holders exist for electronic devices, but do not have additional uses.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides an adjustable holder for holding utensils, and which is manually adjustable.

The device of the present invention provides a holder for utensils that is manually adjustable, and capable of supporting a plurality of utensils in a range of positions from an upright position through an inverted position. The adjustments are incremental. The holder can be attached or mounted to a surface using a suction cup or through use of adhesive or other types of attachment methods. The utensils can be toothbrushes or paintbrushes, or other implements.

In a further embodiment of the invention, the holder is used as a raised and adjustable cell phone support. There is a need for a cell phone support that can be used in wet or damp environments where there is a risk of dropping the cell phone into water. Here, the toothbrush holder has an additional member for securing a cell phone.

Other objects and advantages of the present invention will be more readily apparent from the following detailed description when read in conjunction with the accompanying drawings.

BRIEF DESCRIPTION OF THE DRAWINGS

FIG. 5 is a front elevational view of the portion "A" of FIG. 1 in an assembled view.

FIG. 6 is a perspective view of a right shaft vertical gear used in the holder of FIGS. 1-5.

FIG. 7 is a perspective view of a right washer used in the holder of FIGS. 1-5.

FIG. 8 is a perspective view of a right spring used in the holder of FIGS. 1-5.

FIG. 9 is a perspective view of a right shaft circlip or snap ring used in the holder of FIGS. 1-5.

DETAILED DESCRIPTION OF THE INVENTION

Figure 1:
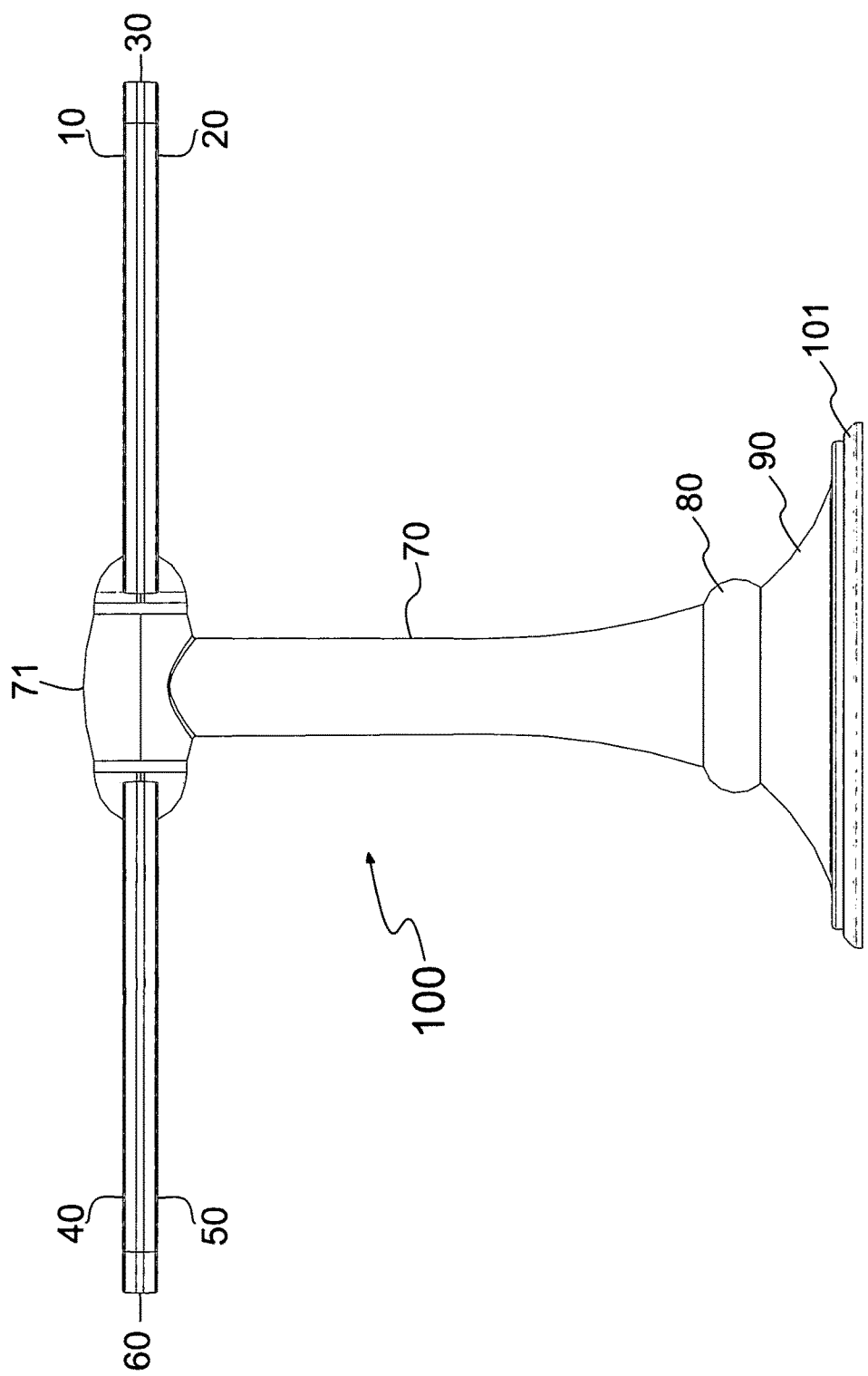
FIG. 1 is a front elevational view of the holder according to the present invention.

An adjustable holder 100 is shown in FIG. 1, which is a front elevational view of the holder 100. The holder 100 can support utensils such as make up brushes, toothbrushes, pens, paintbrushes, and the like. The holder 100 is manually adjustable so that it is capable of supporting utensils in more than one position, as discussed further below.

In one use of the holder 100, for make up brushes, paintbrushes or toothbrushes, it is desirable to orient the brushes in one direction for drying purposes and in another position for convenience of use. For example, in the case of make up brushes and also in the case of toothbrushes, an ideal drying position is one wherein the bristles are disposed at a lower position than the handle to avoid runoff from the bristles onto the handle after use. The same approach is applicable to paintbrushes. In another position, the head of the make up brushes or of toothbrushes, the make up brushes or toothbrushes are oriented so that it is above its handle, for facilitate manual grasping of the make up brushes or toothbrushes. This principle can be applied to other types of utensils as well, including tools that may be cleaned and oriented one way for drying and a different way to facilitate use.

The adjustable holder 100 in a further embodiment is capable of supporting a cell phone or other electronic device such as cell phones and tablet computers, and for positioning such devices at varying angles to facilitate use of these electronic devices in environments that may be wet such as kitchens and bathrooms. In this further embodiment, a strap or flexible band would be used to secure the cell phone to the left superior plate 40 or the right superior plate 10, or other securing means could be used. For example, a cell phone is at risk in a bathroom environment when held in a user's hand, and would be safer when supported by the holder 100.

The holder 100 in FIG. 1 includes a central stem base 90, a suction pad or cup 101 underlying the base 90, and a handwheel 80 disposed atop the base 90. A central stem 70 is supported above the handwheel 80 and the base 90, and supports a right superior plate 10, a right interior plate 20, a right silicone pad 30, a left superior plate 40, a left interior plate 50, a left silicone pad 60, as well as a central stem cap 71 and a mechanism (described further hereunder and shown in FIGS. 4-10 and 11-16) which is provided inside the central stem cap 71.

The phrase "left plate assembly" is used hereafter to describe the assembly that includes the left superior plate 40, the left interior plate 50, and the left silicone pad 60. The phrase "right plate assembly" is used hereafter to describe the assembly that includes the right superior plate 10, the right interior plate 20, and the right silicone pad 30.

The above-mentioned left plate assembly and the right plate assembly of the holder 100 have a common axis of rotation, which lies along a centerline of the holder 100 along a line lying parallel to the pads 30 and 60, along the centerlines thereof. This axis of rotation, if viewed in FIG. 1, is along a line joining the numerals 30 and 60; and in FIG. 2 it is along a horizontal line bisecting the figure. The left plate assembly is independently rotatable about this common axis of rotation, and the right plate assembly of the holder 100 is also independently rotatable about this common axis of rotation.

In use, the above-mentioned mechanism allows independent rotational movement of the left plate assembly and independent rotational movement of the right plate assembly, as discussed further below.

Figure 2:
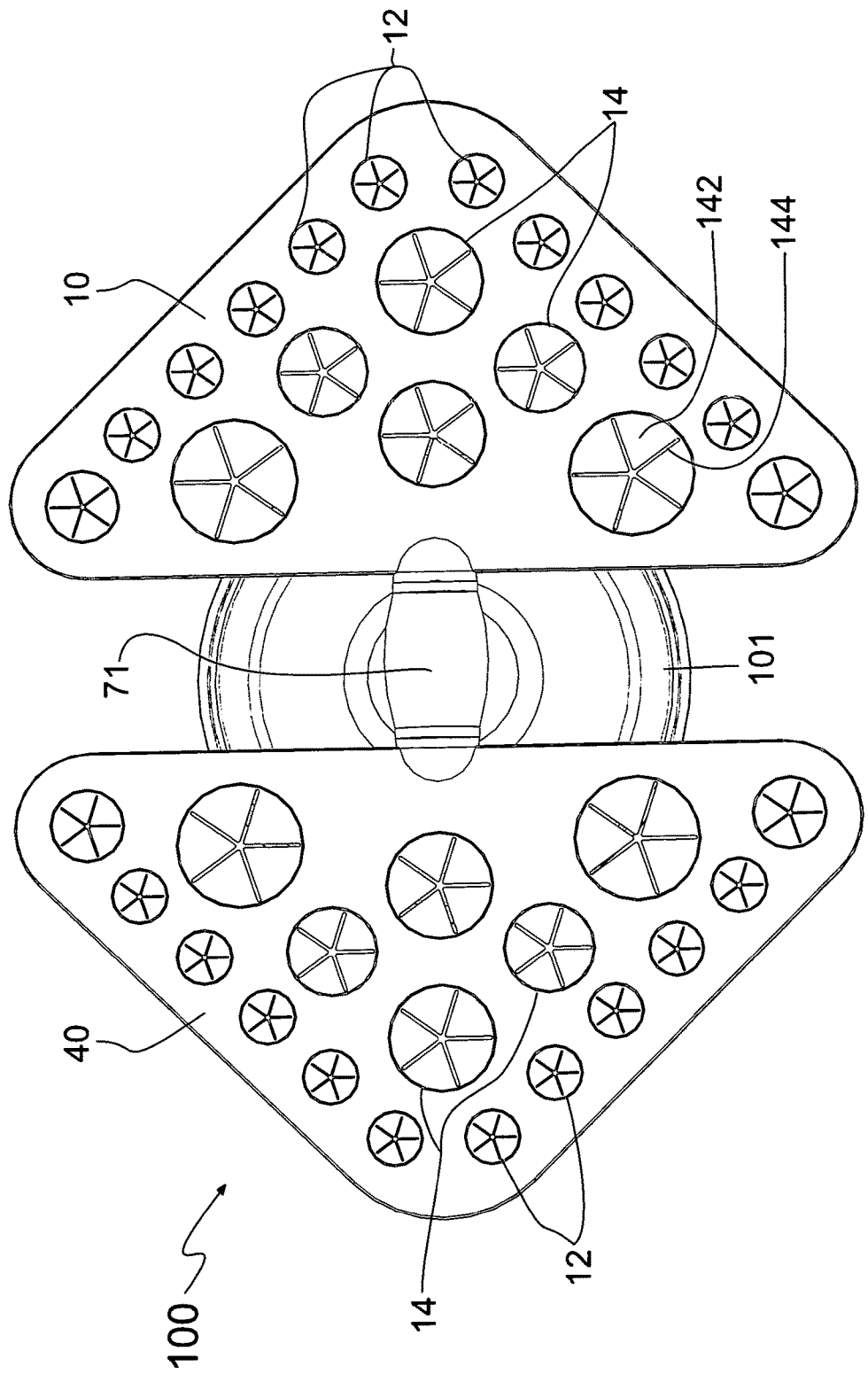
FIG. 2 is a top elevational view of the holder of FIG. 1.

FIG. 2 is a top elevational view of the holder 100 of FIG. 1. As shown in FIG. 2, the plate 10 has a plurality of small holes 12 and larger holes 14 for receiving utensils such as make up brushes or toothbrushes therein. The holes are shown to scale in FIG. 2, wherein the small holes 12 range in size from 15 mm in diameter (ten such holes this size are shown in plate 10 in FIG. 2) and 20 mm in diameter (two such holes this size are shown in plate 10 in FIG. 2, those two such holes being located at the top and bottom portions of plate 10 in this view). The larger holes 14 range in size from 30 mm in diameter (two such holes this size are shown in plate 10 in FIG. 2, along a central portion of plate 10), 25 mm in diameter (two such holes this size are shown in plate 10 just above and below a central horizontal axis in the plate 10), and 35 mm in diameter (two such holes this size are shown in plate 10 in FIG. 2). The holes 12 and 14 of plate 40 are the same as those of plate 10, arranged in a mirror image pattern.

The holes 12 and 14 of various sizes as described above are used for receiving utensils such as make up brushes, toothbrushes, paintbrushes, and so on. The respective left and right silicone pads 30 and 60 are used to resiliently hold the utensils in place, as discussed in further detail below. The utensils can be placed in the holes 12 and 14 with the handle portion inserted first and with the brush portions up, and then the plates 10 and 40 can be rotated so that a brush side is oriented downward so that it can readily drip dry.

The plate 50 has corresponding holes matching the holes 12 and 14 of the plate 40, and the plate 20 has corresponding holes matching the holes 12 and 14 of the plate 10.

The silicone pads 30 and 60 each have a plurality of star-shaped openings formed by slits 144 forming tabs 142 which are resiliently deformable to grasp utensils in frictional engagement to keep them in a fixed position. The star-shaped openings underlie the holes 12 and 14 in the plates 10 and 40 in FIG. 2, and overlie the plates 20 and 50 (shown in FIGS. 1 and 3).

Figure 3:
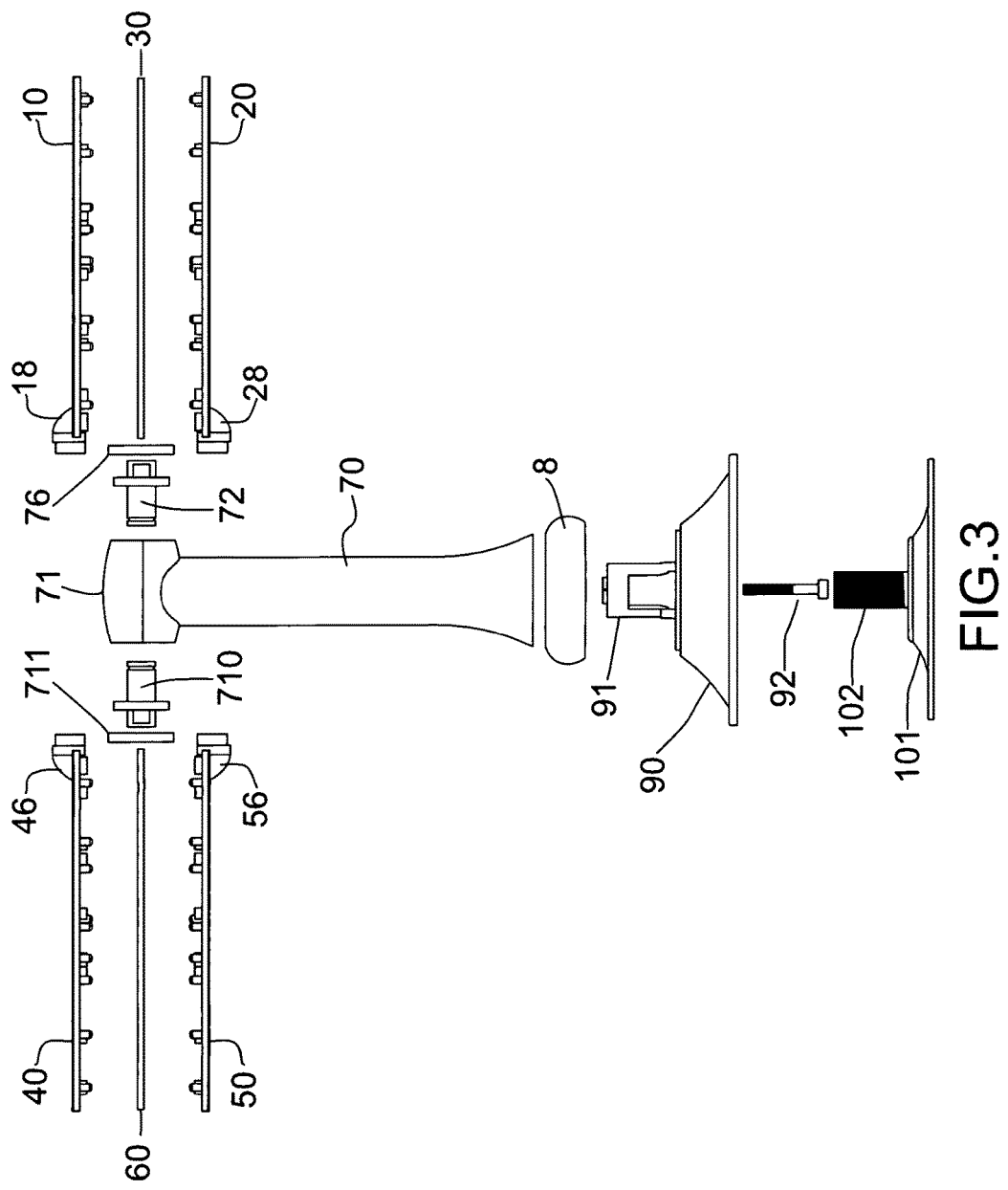
FIG. 3 is a front exploded view of the holder of FIGS. 1 and 2.

FIG. 3 is a front exploded view of the holder 100 of FIGS. 1 and 2. In FIG. 3 the plates 10, 20, 40, and 50 are seen to be substantially planar and are viewed along their front edges. The plate 40 has an upper bearing end portion 46, and the plate 50 has a lower bearing end portion 56. The plate 10 has an upper bearing end portion 18, and the plate 20 has a lower bearing end portion 28. The silicone pads 30 and 60 are also substantially planar and are viewed along their front edges.

As seen in FIG. 3, the suction pad 101 includes a threaded attachment portion 102, and the central stem base 90 has an upstanding portion 91 which receives the threaded attachment portion 102. A screw or bolt 92 passes through the portion 102 and is received in a threaded hole at the top of the upstanding portion 91, so as to secure the suction pad 101 to the central stem base 90. The upstanding portion 91 has an outer periphery that is threaded (not shown) so as to engage with an internal threading of the handwheel 80. The handwheel 80 is provided with the internal threaded portion (not shown) and engages with the threaded outer periphery of the portion 91 in threaded engagement, such that rotation of the handwheel 80 pulls the portion 102 into secure engagement with the central stem 70, and thereby secures the suction pad 101 to the central stem base 90 and also secures the central stem base 90 to the central stem 70. This type of assembly can be varied by any one having skill in the mechanical assembly arts, for example in the manner in which devices can be affixed to automobile windshields (e.g. GPS units) or to tables (e.g. toys to entertain infants and babies). The central stem 70 is thereby secured to the central stem base by the handwheel 80 and by engagement with the portion 91.

In FIG. 3, the above-mentioned right plate assembly is formed by the plate 10, the pad 30, and the plate 20. The above-mentioned left plate assembly is formed by the plate 40, the pad 60, and the plate 50.

Figure 4:
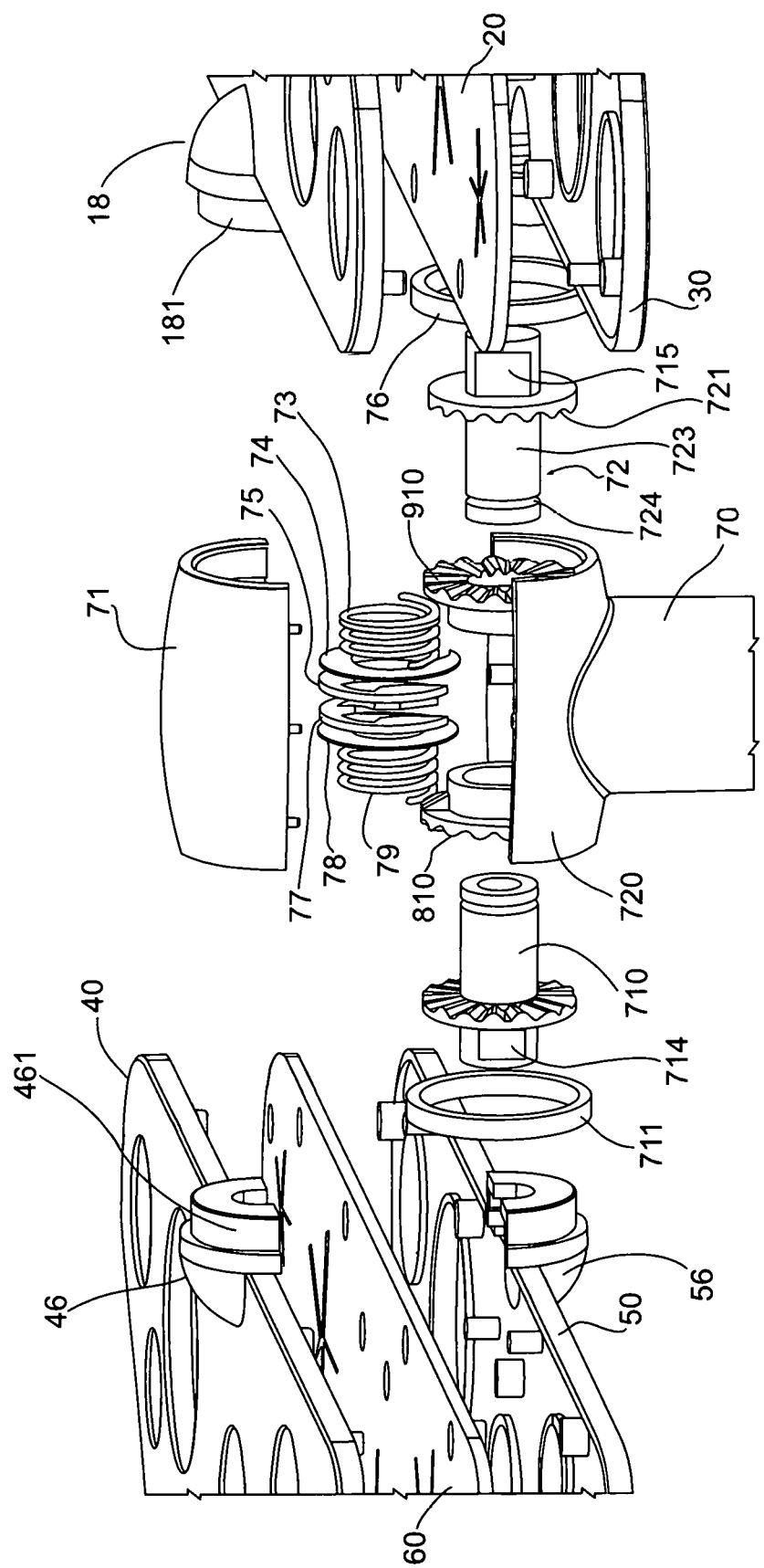
FIG. 4 is a perspective view of an exploded portion of a central stem cap of FIG. 1 as well as a mechanism contained in the central stem cap.

FIG. 4 is a perspective view of the mechanism disposed below the central stem cap 71, which has been mentioned above with regard to FIG. 1. The mechanism shown is disposed under the central stem cap 71, and includes a right shaft vertical gear 72 joining the right plate assembly (plates 10 and 20, and the pad 30), and a left shaft vertical gear 710 joining the left plate assembly (plates 40 and 50, and the pad 60).

In assembled condition, the right shaft vertical gear 72 is fixed in the lower cap portion 720 (also shown in FIGS. 11-15 and discussed further below), such that the right shaft vertical gear 72 cannot rotate. The right shaft vertical gear 72 has a pair of oppositely disposed flat portions 715, one of which is visible in FIG. 4. The right shaft vertical gear joins the right plate assembly (plates 10 and 20, and the pad 30). The left shaft vertical gear 710 has a pair of oppositely disposed flat portions 714, and is similar in function to the right shaft vertical gear 72.

As shown in FIG. 4, the right shaft vertical gear 72 has a shaft portion 723, a groove 724, and a toothed engagement portion 721. The left shaft vertical gear 710 has similar features to that of the right shaft vertical gear 72. The gears 72 and 710 are movable axially, and are respectively spring biased toward an engaged position as discussed further below.

The mechanism of FIG. 4 also includes a right spring 73 which pulls the shaft portion 723 of the gear 72 in an axial direction (which is leftward as viewed in FIG. 4) so as to pull the toothed engagement portion 721 into engagement with an engagement gear 910. That is, the spring 73 pushes against the washer 74 and its other end is fixed by the engagement gear 910. The engagement gear 910 is fixed against rotation in the lower cap portion 720. Because there is toothed engagement between the engagement gear 910 and the right shaft vertical gear 72, the spring force of the spring 73 thereby secures the gear 72 against rotation unless sufficient force is applied to overcome the bias of the spring 73. The spring 73 operates to prevent the gear 72 from rotating relative to the engagement gear 910 when no external force is being applied, or when such external force is insufficient to overcome the spring bias of the spring 73.

FIG. 4 also shows a right washer 74 mounted on the shaft of the gear 72. The mechanism further includes a right shaft circlip 75 which prevents the washer 74 from coming off of the shaft of the gear 72, the circlip 75 being disposed in a groove 724 in a shaft 723 of the gear 72 (the groove 724 and the shaft 723 are shown unnumbered in FIG. 4 and are shown numbered in FIG. 6) to abut against and fix the washer 74 and thus also fix the right spring 73.

FIG. 4 also shows a right ring 76 to prevent opening of the elements on the right side of the gear 72, which is shown also in FIGS. 11-15 and is discussed further below. The upper bearing end portion 18 has a ledge portion 181 which forms a semi-circular periphery, and receives the right ring 76 thereon. The upper bearing end portion 18 is similar in shape and function to the upper bearing end portion 46, the lower bearing end portion 56, and the lower bearing end portion 28.

The mechanism of FIG. 4 also includes a left shaft circlip 77 which prevents a left washer 78 from coming off of a shaft of a left vertical gear 710. The mechanism of FIG. 4 also shows a left spring 79 fixed by the left washer 78; a left shaft vertical gear 710 which is pulled by the left spring 79 in a direction to keep the gear 710 from rotating; and a left ring 711 to prevent opening of the elements on the left side of the gear 710. The gear 710 is similar to the gear 72, and has a similar function as that of the gear 72, and likewise has a groove therein (unnumbered in FIG. 4) to receive a circlip (not shown in FIG. 4) and is disposed on the left side as viewed in FIG. 4. As seen in FIG. 4, the upper bearing end portion 46 has a ledge portion 461 which forms a semi-circular periphery, and receives the left ring 711 thereon.

The pair of engagement gears 810 and 910 fit in an enclosure formed by the cap 71 and the lower cap portion 720. The engagement gears 810 and 910 have radially arranged teeth which mate with the corresponding teeth of the left shaft vertical gear 710 and of the right shaft vertical gear 72, specifically radially arranged teeth of the toothed engagement portion 721. The engagement gear 810, mentioned above, is fixed against rotation as well as against axial movement relative to the lower cap portion 720. The engagement gear 910 is similar to the engagement gear 810, and is likewise secured against relative rotation and against axial movement relative to the lower cap portion 720.

In a preferred embodiment, the lower cap portion 70, the central stem 70, and the gears 810 and 910 are injection molded together and therefore do not need to be secured to each other.

In an alternative construction, which is contemplated as being within the scope of the invention, the gears 810 and 910 can be formed as separate elements and then secured to the lower cap portion 720 by adhesive, ultrasonic welding, or any other type of connection means that would be known to any one having skill in the manufacturing arts. In a further alternative construction, which is also contemplated as being within the scope of the invention, the holder 100 can be formed by 3D printing techniques, such that the lower cap portion 70, the central stem 70, and the gears 810 and 910 are formed together as a connected part, and so would not need to be secured to each other.

In the above, the left side is substantially identical to the right side. Therefore, the description of the right side elements of FIG. 4 applies to the corresponding left side elements.

FIG. 5 is a front elevational view of the above-mentioned mechanism of FIG. 1, in assembled view. The parts are as described in FIG. 4. Here, the view is of the assembled elements disposed within the lower cap portion 720, and with the cap 71 removed.

FIG. 6 is a perspective view of the right shaft vertical gear 72 used in the holder 100 of FIGS. 1-5. The gear 72 includes a shaft 723, a ridged portion 721, and an end portion 722 having an indented flat portion.

FIG. 7 is a perspective view of the right washer 74 used in the holder 100 of FIGS. 1-5.

FIG. 8 is a perspective view of the right spring 73 used in the holder 100 of FIGS. 1-5.

FIG. 9 is a perspective view of the right shaft circlip 75 (also know as a snap ring 75) used in the holder 100 of FIGS. 1-5.

Figure 10:
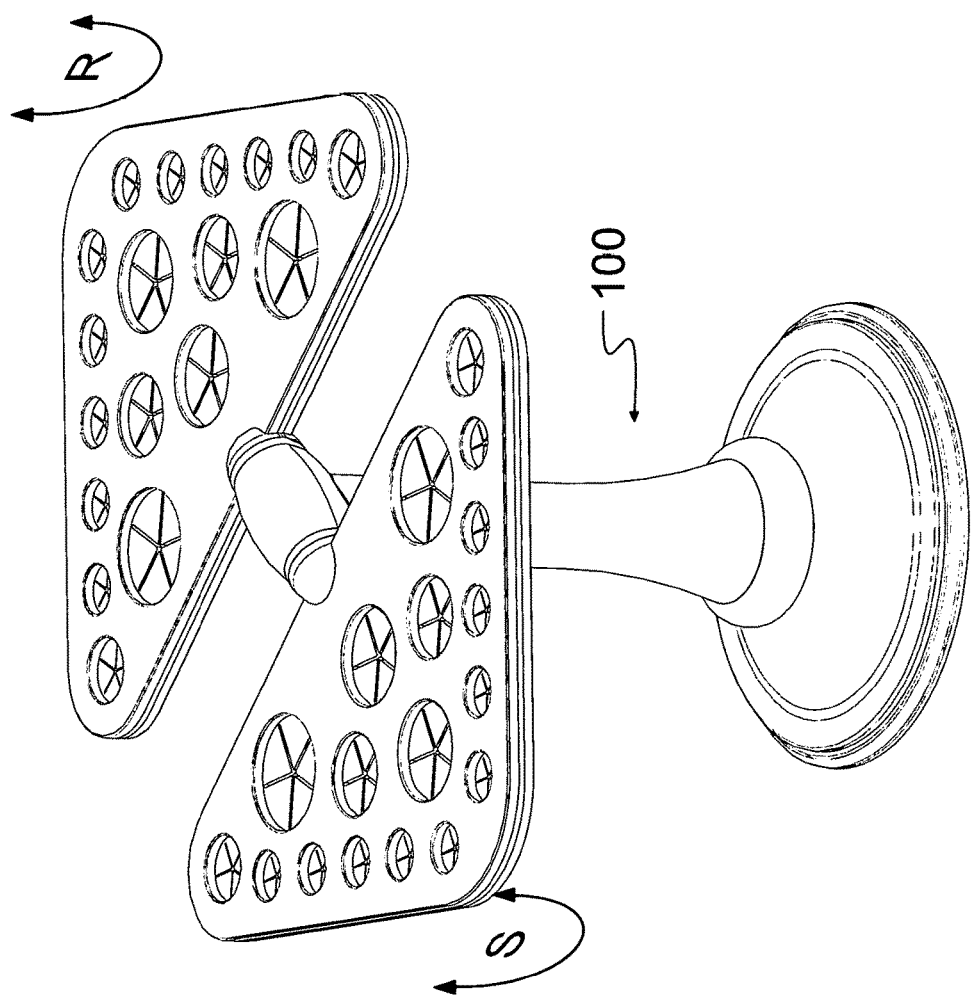
FIG. 10 is a top perspective view of the holder of FIG. 1.

FIG. 10 is a top perspective view of the holder 100 of FIG. 1. As seen in FIG. 10, the left side can rotate about its axis in the directions shown by the double-headed arrow "5", and the right side can rotate about its axis in the directions shown by the double-headed arrow "R".

Figure 11:
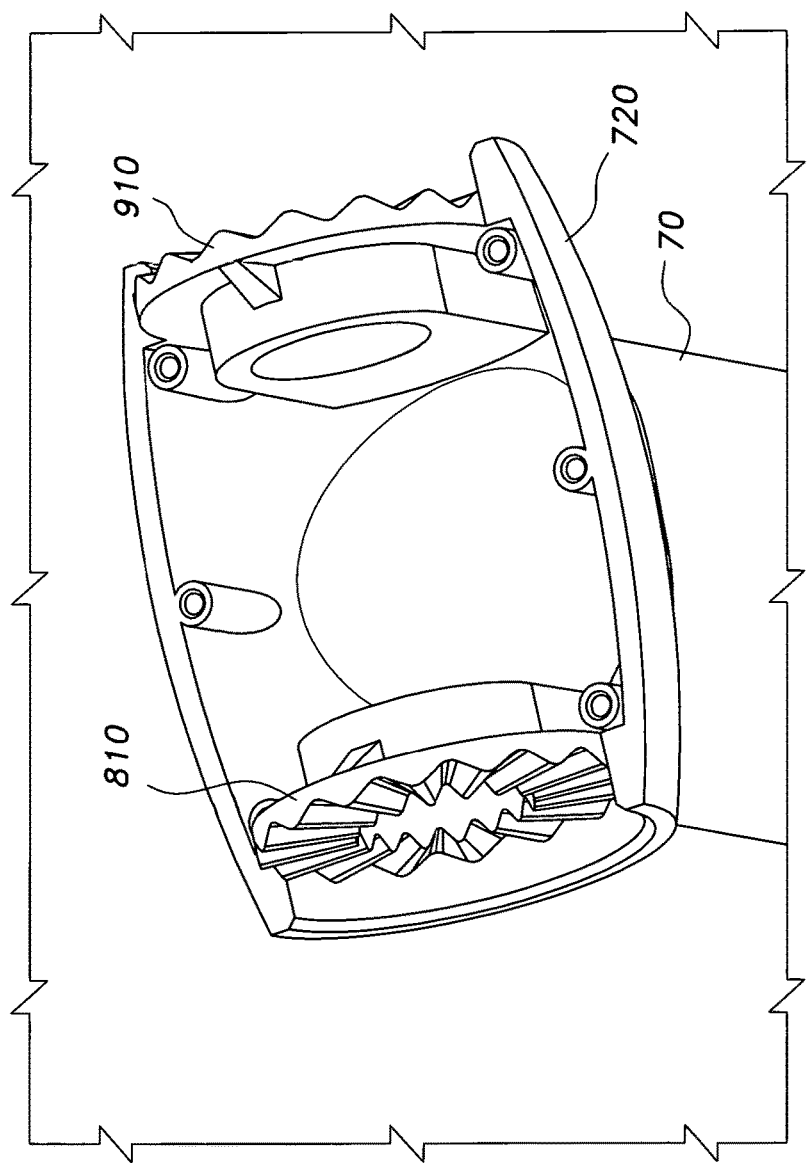
FIG. 11 is a top perspective view of the interior of the lower cap portion, showing a portion of the mechanism of FIG. 4.

FIG. 11 is a top perspective view of the interior of the lower cap portion 720, showing a portion of the mechanism of FIG. 4. This view shows the securement of the gears 810 and 910 to the lower cap portion 720.

Figure 12:
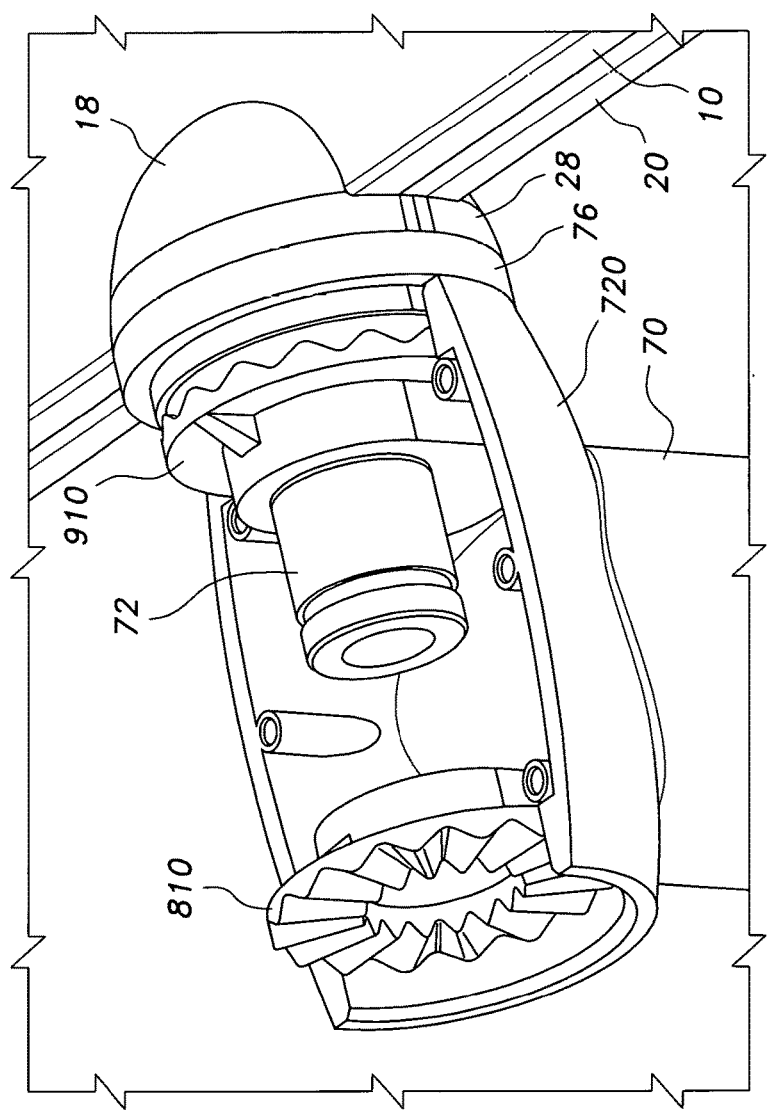
FIG. 12 is a top perspective view of the interior of the lower cap portion shown in FIG. 11, additionally showing a right shaft vertical gear mounted therein.

FIG. 12 is a top perspective view of the interior of the lower cap portion 720 shown in FIG. 11, additionally showing a right shaft vertical gear 72 mounted therein, in toothed engagement with the gear 910. The ring 76 is shown in this view.

Figure 13:
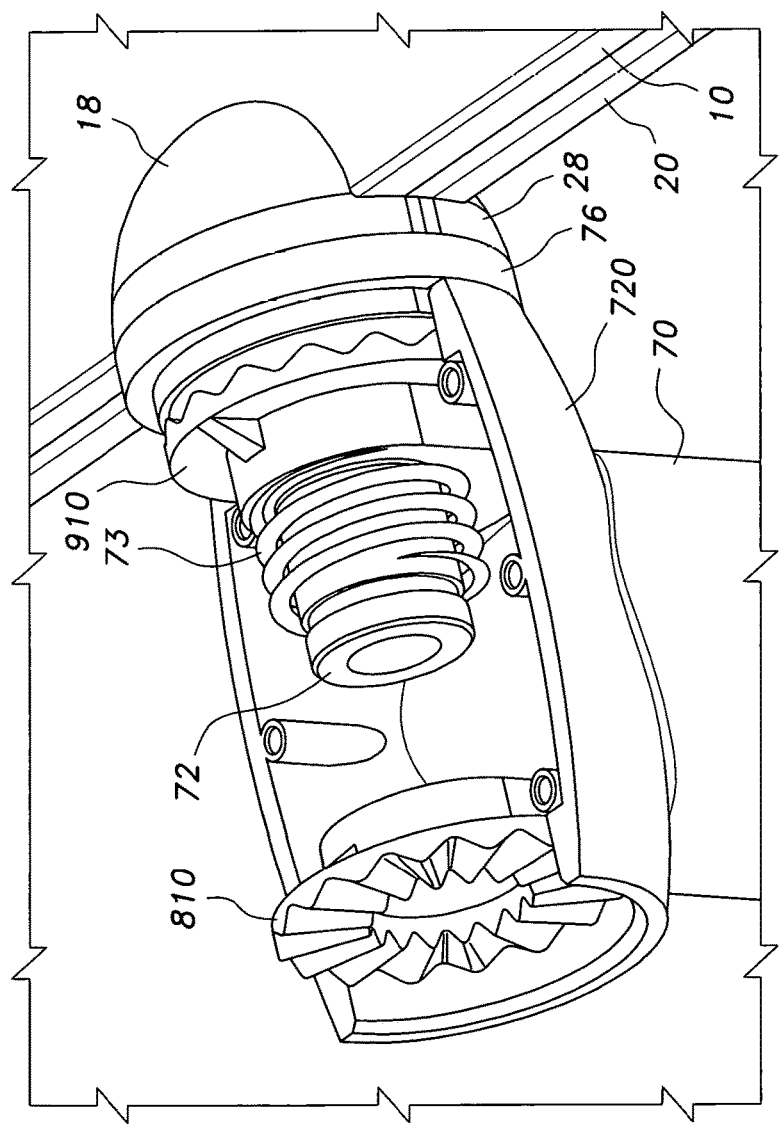
FIG. 13 is a top perspective view of the interior of the lower cap portion shown in FIGS. 11 and 12, additionally showing a right spring mounted therein.

FIG. 13 is a top perspective view of the interior of the lower cap portion 720 shown in FIGS. 11 and 12, additionally showing the right spring 73 mounted therein.

Figure 14:
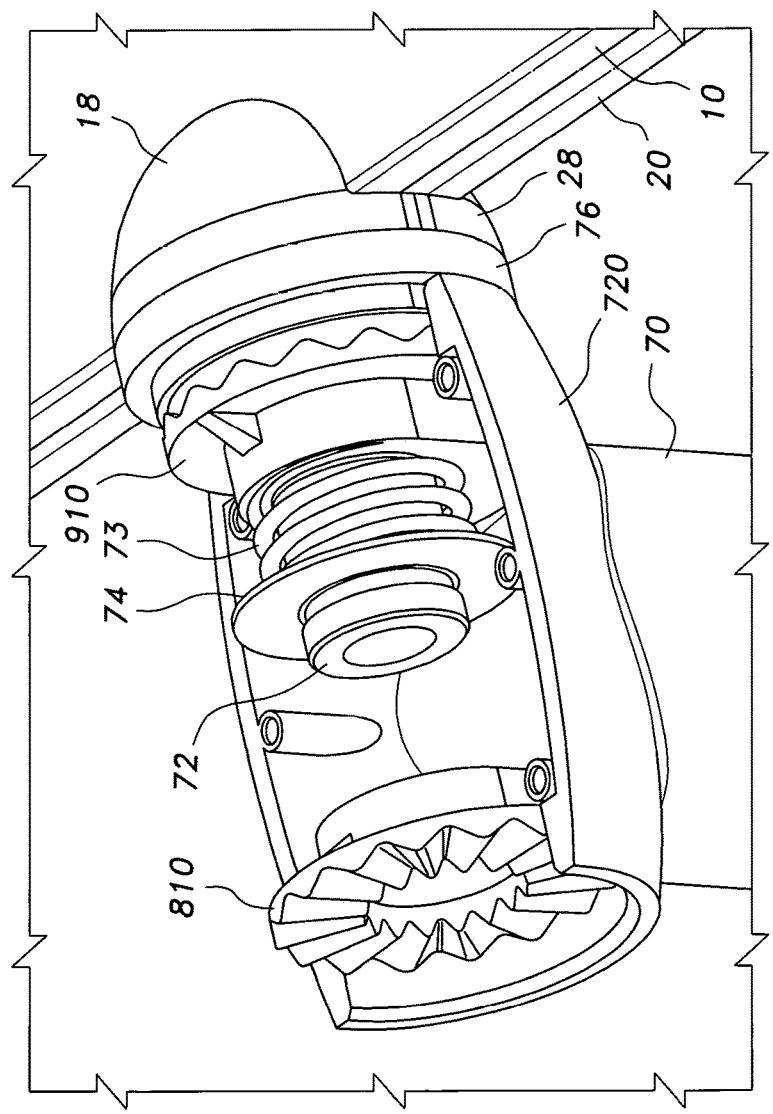
FIG. 14 is a top perspective view of the interior of the lower cap portion shown in FIGS. 11-13, additionally showing a right washer mounted therein.

FIG. 14 is a top perspective view of the interior of the lower cap portion 720 shown in FIGS. 11-13, additionally showing the right washer 74 mounted therein.

Figure 15:
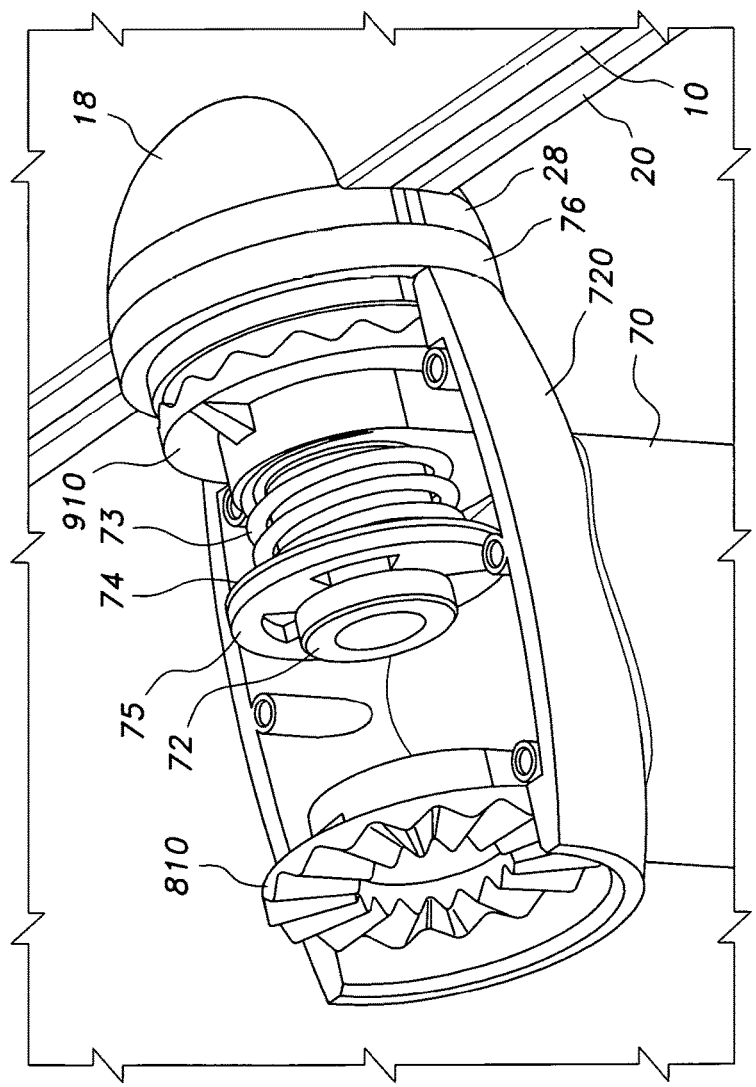
FIG. 15 is a top perspective view of the interior of the lower cap portion shown in FIGS. 11-14, additionally showing a right circlip mounted therein.

FIG. 15 is a top perspective view of the interior of the lower cap portion 720 shown in FIGS. 11-14, additionally showing the right circlip 75 mounted therein.

Figure 16:
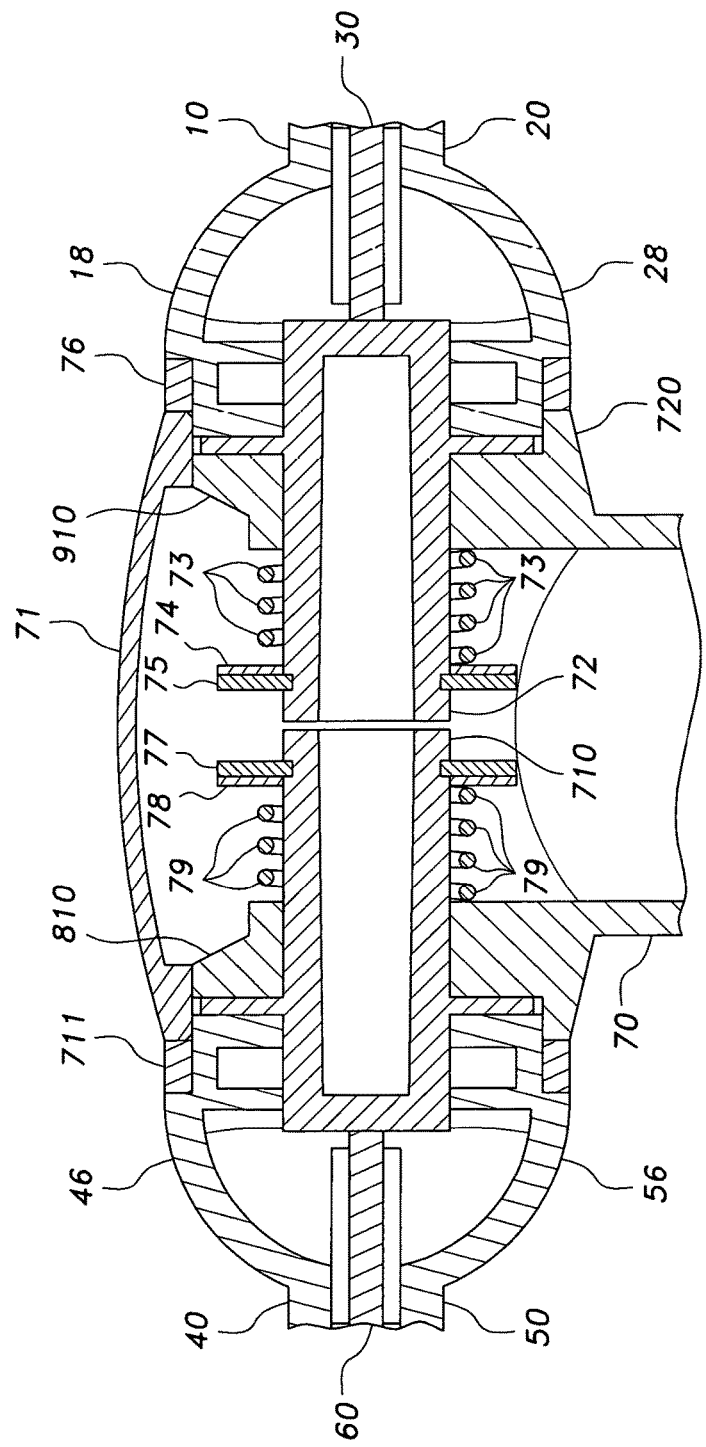
FIG. 16 is a vertical cross sectional view of the mechanism of FIG. 4 and FIGS. 11-15.

FIG. 16 is a vertical cross sectional view of the mechanism of FIG. 4 and FIGS. 11-15. In this view, the parts shown in FIG. 4 are shown in their assembled form. The right side end of the right side vertical gear 72 is secured to the plate assembly (components 10, 20, and 30) as discussed above.

As seen in FIG. 16, the ring 76 secured the upper bearing end portion 18 and the lower bearing end portion 28 against separation. Additionally, the joined parts which are fixed can optionally be secured by adhesive, fasteners such as screws or rivets, and/or by welding such as ultrasonic welding.

Figure 17:
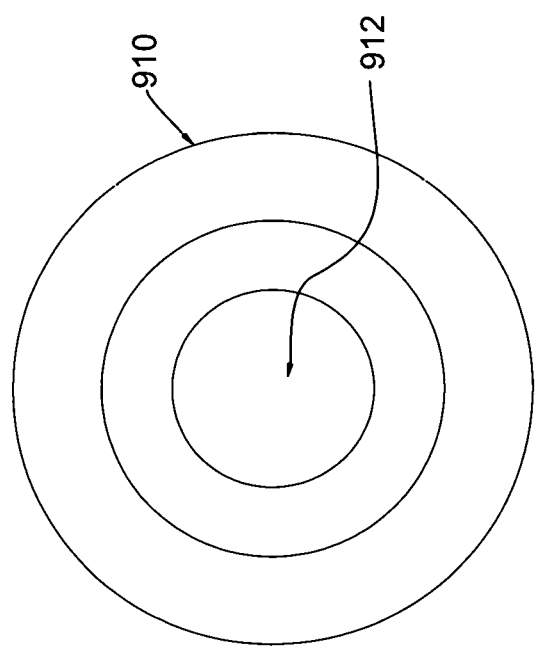
FIG. 17 is an end elevational view of the engagement gear, showing a central bore.

FIG. 17 is an end elevational view of the engagement gear 910, showing a central bore 912.

As is clear from the foregoing, the left and right plate assemblies can be independently manually positioned about the aforementioned axis of rotation, by manually turning, i.e. manual application of torque, such that the radially arranged mating teeth (described above) of the side experiencing the torque will apply a force along the direction of the aforementioned axis of rotation so as to compress the respective one of the springs 73, 79 so that the teeth come out of engagement sufficiently to allow turning of the respective one of the left and right plate assemblies relative to the central stem 70. When the torque is released, the radially arranged teeth are urged back into mating engagement so as to retain the left and right assemblies in place relative to the central stem 70.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. An adjustable holder for holding implements including make up brushes, toothbrushes, and paintbrushes, comprising:
   a central stem base,
   a suction pad underlying said central stem base,
   a central stem having an upper end and a lower end, said lower end of said central stem being supported by said central stem base,
   a left plate assembly supported by said central stem base, said left plate assembly having a plurality of openings adapted to retain implements therein,
   a right plate assembly supported by said central stem base, said right plate assembly having a plurality of openings adapted to retain implements therein,
   a mechanism disposed at said top end of said central stem, said mechanism having a left end supporting said left plate assembly and a right end supporting said right plate assembly; said mechanism being adapted to enable independent manual rotational positioning of said left plate assembly and of said right plate assembly relative to said central stem base; whereby implements retained by said left plate assembly and said right plate assembly can be inverted to facilitate cleaning by being oriented one way for drying and oriented in a different way to facilitate use; wherein said right plate assembly comprises a right superior plate, a right interior plate, and a right silicone pad disposed between said right superior plate and said right interior plate.

2. An adjustable holder as claimed in claim 1, wherein said right superior plate has a first plurality of holes and said right interior plate has a second plurality of holes, and wherein said first plurality of holes overlies and matches said second plurality of holes; and wherein said right silicone pad has a plurality of star-shaped openings wherein each of said star-shaped openings comprises slits in a star-shaped pattern that forms tabs which are resiliently deformable to grasp utensils in frictional engagement to keep them in a fixed position.

3. An adjustable holder as claimed in claim 1, wherein said left plate assembly and the right plate assembly have a common axis of rotation, wherein said common axis of rotation lies along a centerline bisecting said left plate assembly and said right plate assembly.

4. An adjustable holder as claimed in claim 1, wherein said mechanism comprises a right shaft vertical gear which is connected to said right plate assembly, and a left shaft vertical gear which is connected to said left plate assembly.

5. An adjustable holder as claimed in claim 4, wherein said right shaft vertical gear has a shaft portion, a groove, and a toothed engagement portion, and wherein said right shaft vertical gear is movable along an axial direction of said shaft portion.

6. An adjustable holder as claimed in claim 5, further comprising:
   an engagement gear fixedly supported by said upper end of said central stem, said engagement gear having a toothed engagement portion; and
   a right spring which urges said shaft portion of said right shaft vertical gear in said axial direction to urge said toothed engagement portion of said right shaft vertical gear into engagement with said toothed engagement portion of said engagement gear.

7. An adjustable holder as claimed in claim 6, further comprising a circlip secured in said groove in said right shaft vertical gear;
   a washer mounted on said shaft portion of said right shaft vertical gear; and
   a spring coaxially disposed about said shaft portion of said right shaft vertical gear, said spring having a first end and a second end, said first end of said spring being in contact with said washer, and said second end of said spring biasing said toothed engagement portion away from said circlip and into engagement with said toothed engagement portion of said engagement gear;
   whereby torque applied to said right shaft vertical gear relative to said engagement gear causes compression of said spring such that said right shaft vertical gear can turn relative to said engagement gear.

8. An adjustable holder as claimed in claim 1, wherein said plurality of openings include a first set of openings having a first diameter, a second set of openings having a second diameter, and a third set of openings having a third diameter.

9. An adjustable holder as claimed in claim 8, further comprising a plurality of make up brushes having a plurality of sizes, and wherein said plurality of openings are adapted to hold respective ones of said make up brushes having a variety of sizes.

10. An adjustable holder for holding implements including make up brushes, toothbrushes, and paintbrushes, comprising:
    a central stem base,
    a suction pad underlying said central stem base,
    a central stem having an upper end and a lower end, said lower end of said central stem being supported by said central stem base,
    a left plate assembly supported by said central stem base, said left plate assembly having a plurality of openings adapted to retain implements therein,
    a right plate assembly supported by said central stem base, said right plate assembly having a plurality of openings adapted to retain implements therein, a mechanism disposed at said top end of said central stem, said mechanism having a left end supporting said left plate assembly and a right end supporting said right plate assembly; said mechanism being adapted to enable independent manual rotational positioning of said left plate assembly and of said right plate assembly relative to said central stem base; whereby implements retained by said left plate assembly and said right plate assembly can be inverted to facilitate cleaning by being oriented one way for drying and oriented in a different way to facilitate use;

wherein said left plate assembly comprises a left superior plate, a left interior plate, and a left silicone pad disposed between said left superior plate and said left interior plate.

11. An adjustable holder as claimed in claim 10, wherein said left superior plate has a first plurality of holes and said left interior plate has a second plurality of holes, and wherein said first plurality of holes overlies and matches said second plurality of holes; and wherein said left silicone pad has a plurality of star-shaped openings wherein each of said star-shaped openings comprises slits in a star-shaped pattern that forms tabs which are resiliently deformable to grasp utensils in frictional engagement to keep them in a fixed position.

* * * * *